(12) United States Patent
Soma et al.

(10) Patent No.: US 12,052,586 B2
(45) Date of Patent: Jul. 30, 2024

(54) CLOSED LOOP WEIGHT ADAPTION FOR TRAFFIC TYPES

(71) Applicant: Dell Products L.P., Round Rock, TX (US)

(72) Inventors: Dileep Kumar Soma, Round Rock, TX (US); Harpreet S. Narula, Austin, TX (US); Minho Cheong, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/168,309

(22) Filed: Feb. 5, 2021

(65) Prior Publication Data

US 2022/0256361 A1    Aug. 11, 2022

(51) Int. Cl.
*H04W 24/02* (2009.01)
*H04L 49/90* (2022.01)
*H04L 69/22* (2022.01)

(52) U.S. Cl.
CPC ............. *H04W 24/02* (2013.01); *H04L 49/90* (2013.01); *H04L 69/22* (2013.01)

(58) Field of Classification Search
CPC ......... H04W 24/02; H04L 49/90; H04L 69/22
See application file for complete search history.

(56) References Cited

U.S. PATENT DOCUMENTS

| 10,602,388 | B1* | 3/2020 | Rengarajan | H04L 43/0852 |
| 2017/0142017 | A1* | 5/2017 | Davis | H04L 47/24 |
| 2020/0196182 | A1* | 6/2020 | Nam | H04W 84/12 |
| 2022/0060930 | A1* | 2/2022 | Khoury | H04L 47/6215 |
| 2022/0132528 | A1* | 4/2022 | Changlani | H04W 72/121 |

* cited by examiner

*Primary Examiner* — Jae Y Lee
(74) *Attorney, Agent, or Firm* — Terrile, Cannatti & Chambers, LLP; Stephen A. Terrile

(57) ABSTRACT

A system, method, and computer-readable medium are disclosed for performing an intelligent connectivity operation. The intelligent connectivity operation includes: generating an uplink packet by a client information handling system, the uplink packet corresponding to a particular packet traffic type; associating packet quality of service information with the uplink packet; receiving a down link packet to the client information handling system; determining whether the down link packet corresponds to the particular packet traffic type; and, associating the down link packet with the packet priority information of the uplink packet when the downlink packet corresponds to the particular packet traffic type.

20 Claims, 6 Drawing Sheets

CLOSED LOOP WEIGHT ADAPTION FOR TRAFFIC TYPES

BACKGROUND OF THE INVENTION

Field of the Invention

The present invention relates to information handling systems. More specifically, embodiments of the invention relate to performing an intelligent connectivity operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an intelligent connectivity operation, comprising: generating an uplink packet by a client information handling system, the uplink packet corresponding to a particular packet traffic type; associating packet quality of service information with the uplink packet; receiving a down link packet to the client information handling system; determining whether the down link packet corresponds to the particular packet traffic type; and, associating the down link packet with the packet priority information of the uplink packet when the downlink packet corresponds to the particular packet traffic type.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: generating an uplink packet by a client information handling system, the uplink packet corresponding to a particular packet traffic type; associating packet quality of service information with the uplink packet; receiving a down link packet to the client information handling system; determining whether the down link packet corresponds to the particular packet traffic type; and, associating the down link packet with the packet priority information of the uplink packet when the downlink packet corresponds to the particular packet traffic type.

In another embodiment the invention relates to a computer-readable storage medium embodying computer program code, the computer program code comprising computer executable instructions configured for: generating an uplink packet by a client information handling system, the uplink packet corresponding to a particular packet traffic type; associating packet quality of service information with the uplink packet; receiving a down link packet to the client information handling system; determining whether the down link packet corresponds to the particular packet traffic type; and, associating the down link packet with the packet priority information of the uplink packet when the downlink packet corresponds to the particular packet traffic type.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
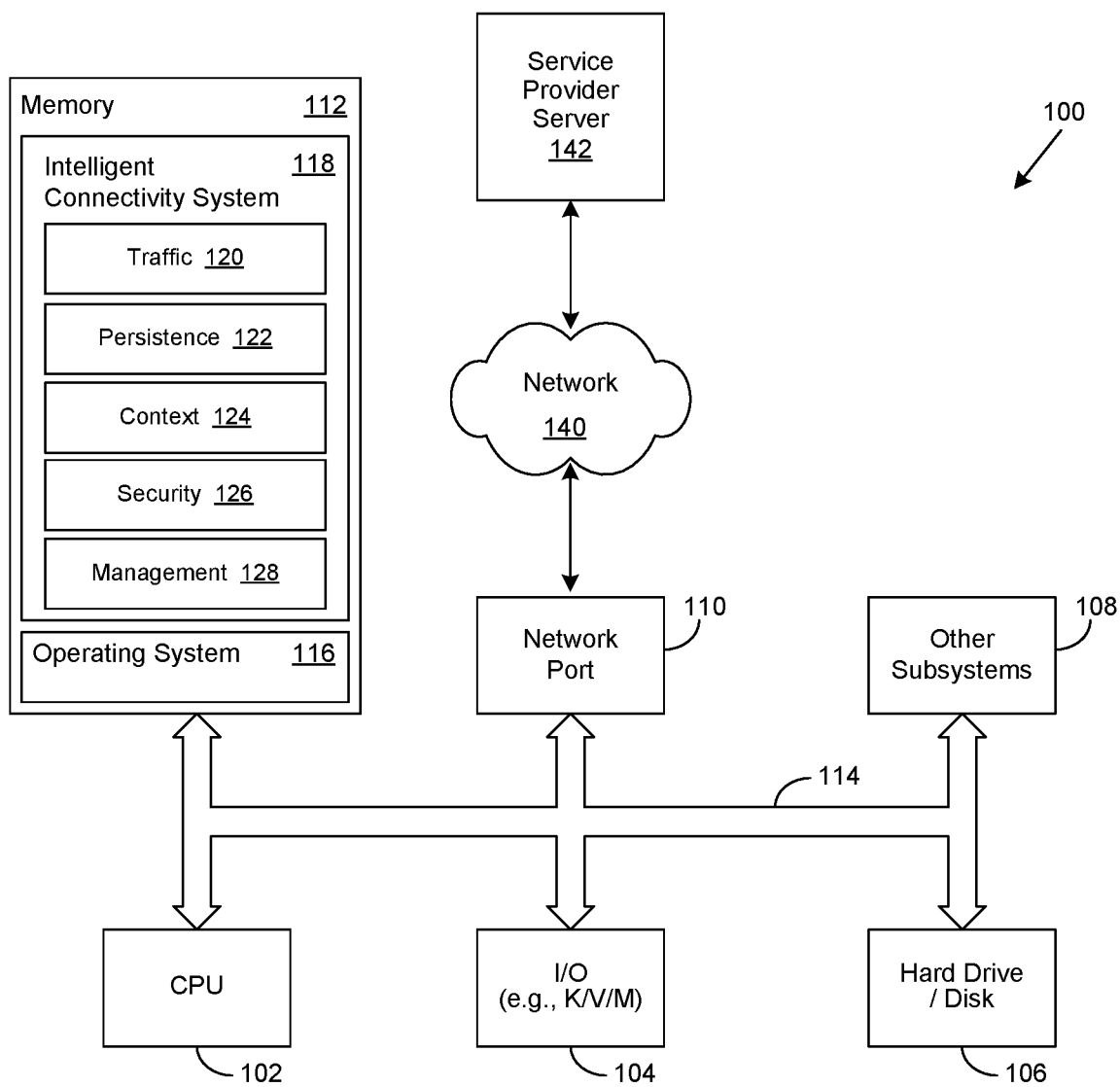
FIG. 1 shows a general illustration of components of an information handling system as implemented in the system and method of the present invention.

A system, method, and computer-readable medium are disclosed for performing an intelligent connectivity operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Certain aspects of the invention reflect an appreciation that a network-enabled device, as typically implemented, will equally allocate available network bandwidth to the applications it may be running at the time. Various aspects of the invention likewise reflect that such bandwidth allocation may result in throttling the performance of certain high-priority applications (e.g., voice communication. videoconferencing, real-time data acquisition, etc.). Likewise, various aspects of the invention reflect an appreciation that certain bandwidth optimization services (BOS) approaches are known, which as typically implemented, distribute a higher allocation of available network bandwidth to high priority applications by reducing bandwidth allocation to lower priority applications.

Various aspects of the invention reflect an appreciation that such BOS approaches generally rely on certain information associated with applications, processes, and operations currently executing on the network-enabled device. Furthermore, these BOS approaches generally do not incorporate bandwidth availability and related information from the access point (AP), or other network resources, the device may be communicating with when making their bandwidth allocation recommendations or decisions. Moreover, various aspects of the invention reflect an appreciation that certain BOS approaches only work when a single user device is on the network and is consuming more than 80% to 90% of the bandwidth available from a particular AP. Likewise, certain aspect of the invention reflect an appreciation that the efficacy of such client-side BOS approaches may be further limited due to challenges associated with a user device auto-detecting, and assessing, network bandwidth availability in a noisy, multi-user wireless network environment.

Certain aspects of the invention likewise reflect an appreciation that network traffic prioritization has become more prevalent in recent years, and as such, has increasingly become a key component of known traffic shaping approaches. Likewise, certain aspects of the invention reflect an appreciation that such approaches, whether proposed or currently employed, are applicable for use in both client-only implementations and in a closed-loop network environment. Certain aspects of the invention reflect an appreciation that these traffic prioritization approaches generally utilize uplink and downlink weight adaptation to prioritize each type, or class, of network traffic.

As typically implemented, these approaches are generally based upon certain predetermined network bandwidth limits, or a static weighting mechanism, or a combination of the two. Certain aspects of the invention reflect an appreciation that such predetermined and static approaches are not adaptive to real-time changes in network traffic requirements on uplink and downlink. Furthermore, they do not provide a closed-loop feedback mechanism to manipulate the weighting of transmission and reception bandwidth allocation in a closed-loop network environment.

Accordingly, certain aspects of the invention reflect an appreciation that such predetermined or static approaches to network traffic prioritization are unable to optimally utilize available network bandwidth. Furthermore, this inability will often lead to improper weightage being assigned to different types, or classes, of network traffic. Moreover, high-priority classes of network traffic (e.g., voice communication, videoconferencing, real-time process control, etc.) will likely not receive the prioritization they may need, which in turn may lead to a sub-par user experience, system performance, or both.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. One example of an intelligent connectivity operation is a packet Quality of Service (QoS) operation, likewise described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
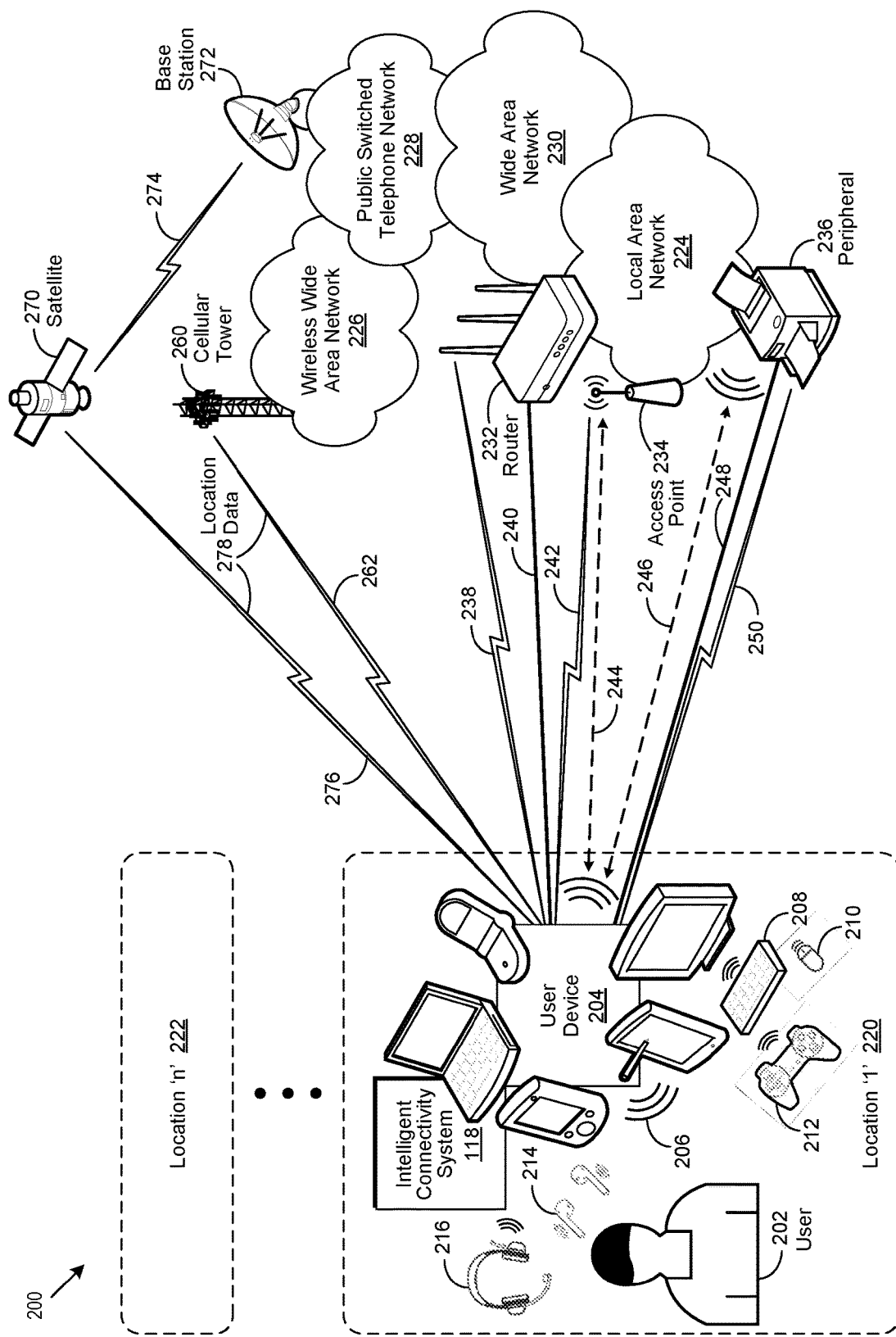
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204 is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276 may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1' 4 network tunnel '1', network traffic queue '2' 4 network tunnel '1', and network traffic queue '3' 4 no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
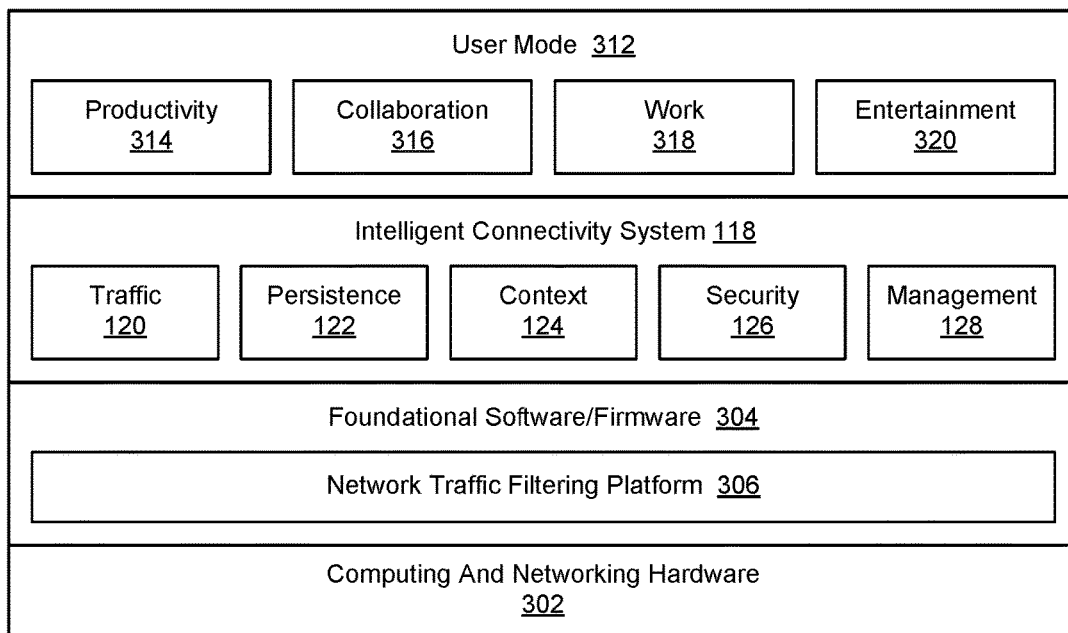
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a Windows® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered, she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
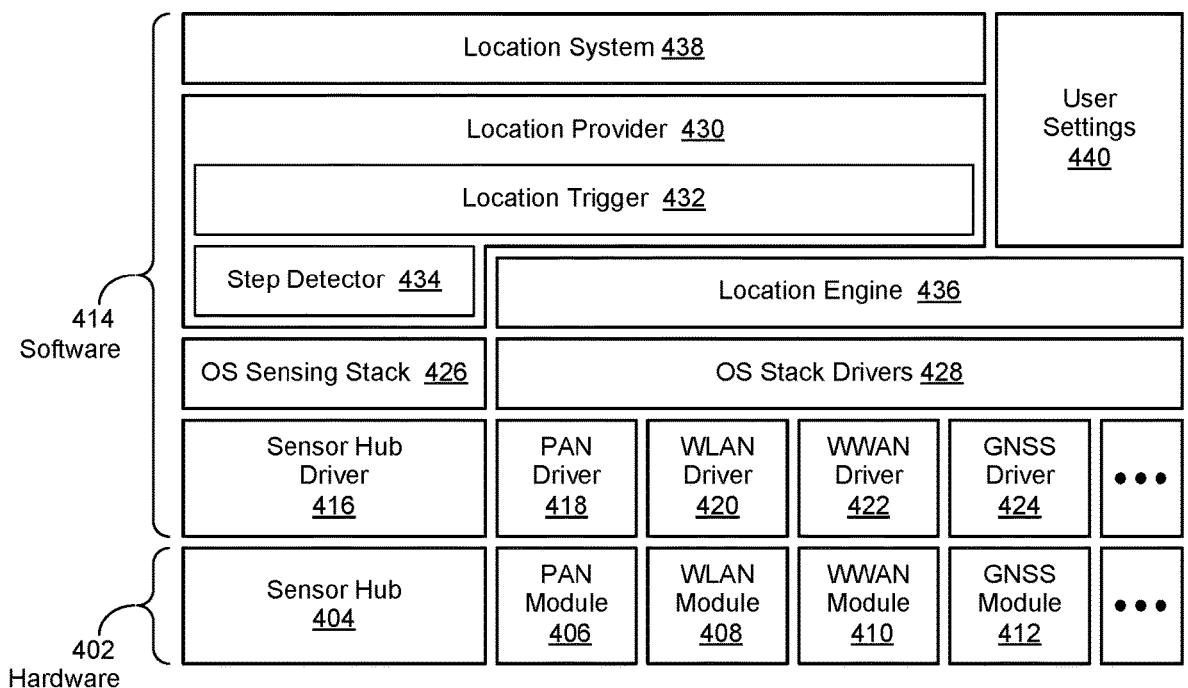
FIG. 4 shows hardware and software components used in the performance of a packet Quality of Service (QoS) operation.

FIG. 4 shows hardware and software components used in the performance of an intelligent connectivity operation implemented in accordance with an embodiment of the invention. In various embodiments, a user device may be implemented with certain hardware 402 and software 414 components that it may use to determine its location and the location of certain network links, described in greater detail herein. In certain embodiments, the hardware components 402 may include a location sensor hub 404 module, a Personal Area Network (PAN) 406 module, a Wireless Local Area Network (WLAN) 408 module, a Wireless Wide Area Network (WWAN) 410 module, a Global Navigation Satellite System (GNSS) 412 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the INTEL® Integrated Sensor Hub (ISH).

In certain embodiments, the PAN 406 module may be implemented to communicate data through a network link to an associated PAN, described in greater detail herein. In certain embodiments, the WLAN 408 module may be implemented to communicate data through a network link to an associated WLAN, likewise described in greater detail herein. Likewise, as described in greater detail herein, the WWAN 410 module may be implemented in certain embodiments to communicate data through a network link to an associated WWAN. In various embodiments, as likewise described in greater detail herein, the GNSS 412 module may be implemented to receive certain Global Position System (GPS) data from a GPS satellite.

In certain embodiments, the software components 414 may include a sensor hub 416 driver, a PAN 418 driver, a WLAN 420 driver, a WWAN 422 driver, a GNSS 424 driver and so forth. In certain embodiments, the sensor hub 416, PAN 418, WLAN 420, WWAN 422, and GNSS 424 drivers may be implemented to respectively provide a programming interface to control and manage the sensor hub 404, PAN 406, WLAN 408, WWAN 410, and GNSS 412 modules. In certain embodiments, the software components 414 may likewise include an operating system (OS) sensing stack 426 and OS stack drivers 428 familiar to skilled practitioners of the art.

Likewise, in certain embodiments, the software components 414 may include a location engine 436. In certain embodiments, the location engine 436 may be implemented to perform a location determination operation. As used herein, a location determination operation broadly refers to any operation performed to determine the location of a user device, and the location of an available network, and the distance between the two.

In certain embodiments, the software components 414 may likewise include a location provider 430 module. In certain embodiments, the location provider 430 module may be implemented to include a location trigger 432 sub-module, or a step detector 434 sub-module, or both. In various embodiments, the location trigger 432 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 432 sub-module may be implemented to generate an alert when an associated user device approaches the boundaries of a particular geo-fence. In certain embodiments, the step detector 434 sub-module may be implemented to measure individual steps a user may make in the course of using a particular user device. In various embodiments, the step detector 434 sub-module may be implemented to use certain information provided by a motion sensor, or accelerometer, or both, to make such user step measurements.

In various embodiments, the location trigger 432 sub-module and the step detector 434 sub-module may be implemented, individually or in combination, to provide certain location information they may generate to the location provider 430 module. In various embodiments, the location provider 430 module may be implemented to generate location information for use by software applications executing on a user device. In certain embodiments, the location provider 430 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 430 module may be implemented to use certain location information provided by the location trigger 432 and step detector 434 sub-modules to provide location information for use in a location network tag (LNT), described in greater detail herein. One known example of a location provider 430 module is the Windows® Location Provider®, familiar to those of skill in the art.

In certain embodiments, the software components 414 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 430, or LNT information it may generate, in the use of such AI and ML approaches.

In certain embodiments, the software components 414 may likewise include a user settings 440 module. In certain embodiments, the user settings 440 module may be implemented to store certain network connectivity settings associated with a user of a user device. Skilled practitioners of the art will recognize that many such embodiments are possible. Accordingly, the foregoing is not intended to limit the spirit, scope, or intent of the invention.

Figure 5:
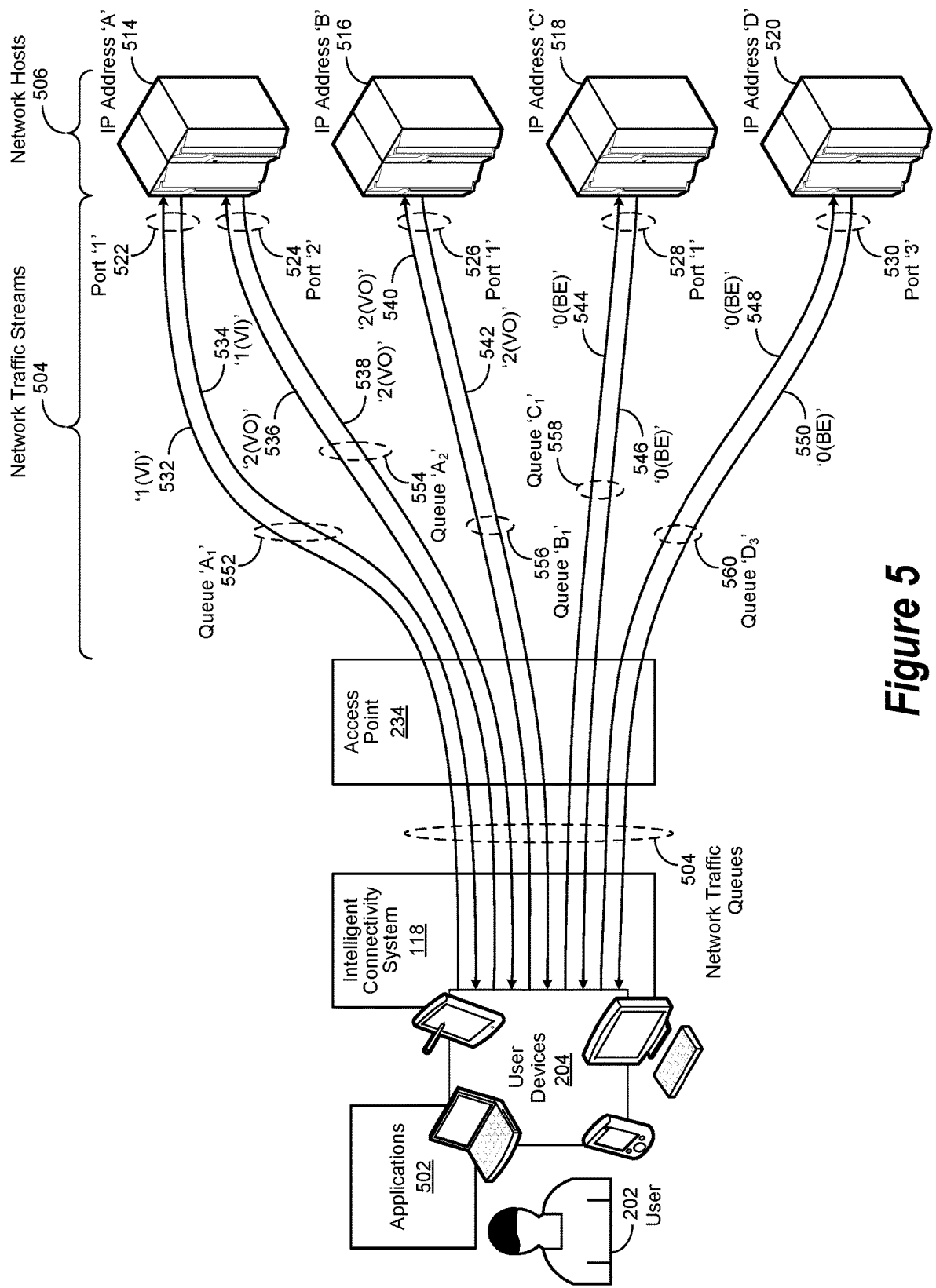
FIG. 5 shows a simplified block diagram of the performance of packet QoS operations.

FIG. 5 shows a simplified block diagram of the performance of packet Quality of Service (QoS) operations implemented in accordance with an embodiment of the invention. Skilled practitioners of the art will be familiar with QoS, which as commonly used refers to the description or measurement of the overall performance of a service, such as a telephony network, a computer network, or a cloud computing service. Those of skill in the art will likewise be aware that such description or measurement of QoS network performance may include the service's latency, reliability, throughput, and preferences for different packet traffic types. Furthermore, such QoS performance for a particular network link may change dynamically over a particular period of time (e.g., 10 ms, 10 seconds, one minute, and so forth).

Accordingly, various embodiments of the invention reflect an appreciation that it may be advantageous to assign a QoS packet priority, or allocation of available network bandwidth, or both, to individual packets within a stream of network traffic 504 associated with a particular application 502 being executed on a user device 204. In certain embodiments, the QoS packet priority, or the allocation of available network bandwidth, or both, assigned to individual packets within a stream of network traffic 504 may be implemented to correspond to a particular quality of service level associated with a particular application 502 executing on a user device 204. Certain embodiments of the invention reflect an appreciation that it may likewise be advantageous to perform such assignment deterministically and dynamically, whether individual streams of network traffic are associated with the same application, or not.

As an example, online gaming typically involves two types of network traffic, the first for input/out (I/O) control, and the second for video streaming. In this example, QoS attributes for I/O control network traffic typically include very low latency (e.g., <10 ms) and relatively low network bandwidth (e.g. 1 Mbps). Likewise, QoS attributes for video streaming network traffic typically include moderate latency (<50 ms) and high network bandwidth (e.g., 100 Mbps). Accordingly, it would be advantageous in this example to assign a very high QoS packet priority (e.g., '1' for latency of <10 ms), and a relatively low allocation of network bandwidth (e.g. 1 Mbps.), to network packets associated with the online game's I/O control. Likewise, it would be advantageous to assign a moderately high QoS packet priority (e.g., '2' for latency of <50 ms), and a relatively high allocation of network bandwidth (e.g., 100 Mbps), to network packets associated with the online game's video streaming. By doing so, the respective QoS objectives of both the I/O control and video streaming network traffic streams 504 may be met.

As used herein, a packet QoS operation broadly refers to any operation that may be performed to assign a particular QoS packet priority, or allocation of available network bandwidth, or other QoS parameter, to individual packets within a stream of network traffic 504. In certain embodiments, the other QoS parameters may include congestion, latency, signal strength, supported protocols, and other QoS parameters familiar to skilled practitioners of the art. In certain embodiments, a particular stream 504 of network traffic may include one or more queues of network packets. In certain embodiments, such queues of network packets may include packets that have been assigned the same, or substantively the same, QoS packet priority, or allocation of available bandwidth, or other QoS parameter.

In certain embodiments, a particular queue of network packets (e.g., queues '$A_1$' 552, '$A_2$' 554, '$B_1$' 556, '$C_1$' 558, and '$D_3$' 560) may be directed to a particular Internet Protocol (IP) address (e.g., 'A' 514, 'B' 516, 'C' 518, and 'D' 520) associated with a particular network host 506, such as a server. In certain embodiments, a particular queue of network packets may further be directed to a particular port (e.g., port '1', '2', '3', and so forth) associated with a particular IP address. In certain embodiments, a particular queue of network packets may be associated with a particular application 502 being executed on a particular user device 204. In these embodiments, the QoS packet priority, the network bandwidth allocation, or other QoS parameters assigned to a particular network packet, and the method by which it is assigned is a matter of design choice. In these same embodiments, the method by which a particular queue of such network packets is associated with a particular application 502 executing on a particular user device 204, and the selection of their destination IP address and associated port, is likewise a matter of design choice.

In certain embodiments, the performance of a packet QoS operation may include the performance of one or more packet prioritization operations. As used herein, a packet prioritization operation broadly refers to any operation associated with assigning a QoS packet priority value, described in greater detail herein, to a particular network packet. In certain embodiments, the QoS packet priority value may be implemented to give precedence to the communication, or processing, of one network packet over another, as described in greater detail herein.

In certain embodiments, the performance of a packet QoS operation may likewise include the performance of one or more bandwidth allocation operations. As used herein, a bandwidth allocation operation broadly refers to any operation performed to allocate a particular amount of available bandwidth to a particular network packet, as described in greater detail herein. Likewise, in certain embodiments, the performance of a packet QoS operation may include the performance of one or more network packet queueing operations. As used herein, a network packet queueing operation broadly refers to any operation performed to assign a particular network packet to a particular queue of network packets, or assign a particular queue of network packets to a particular IP address, or a particular port associated therewith, or a combination thereof.

Referring now to FIG. 5, in various embodiments, a user 202 may use a particular user device 204 to execute one or more applications 502. In certain of these embodiments, the user device 204 may be implemented with an intelligent connectivity system 118, described in greater detail herein. In various embodiments, the intelligent connectivity system 118 may be implemented to tag certain uplink network packets associated with one or more applications 502 with a corresponding QoS tag. In various embodiments, the QoS tag may be implemented to reference certain network packet QoS information, such as packet priority information, bandwidth allocation information, and other QoS information familiar to those of skill in the art. As used herein, an uplink network packet broadly refers to a network packet containing information generated by a particular application 502 that is destined for provision to a particular network host 506.

In certain embodiments, network packet prioritization operations may begin by each uplink network packet generated by an application 502 being tagged with a QoS tag by the intelligent connectivity system 118 to classify its packet traffic type. In various embodiments, the packet traffic type may be classified according to certain packet QoS information, described in greater detail herein, such as information associated with the prioritization of the uplink network packet, the amount of bandwidth it should be allocated, if available, and other related QoS information. In these embodiments, the packet QoS information used to classify a particular uplink network packet, the method by which it is classified, and the naming conventions used for the QoS tag, is a matter of design choice.

As an example, QoS tag '1(VI)' 532 may be applied to an uplink network packet associated with videoconferencing application, which may designate a very high QoS packet priority (e.g., '1' for latency of <10 ms) for voice communication, and a relatively high allocation of network bandwidth (e.g., 100 Mbps) for video streaming. Likewise, QoS tag '2(VO)' 536 may be applied to an uplink network packet associated with a video chat application, which may designate a moderately high QoS packet priority (e.g., '2' for latency of <50 ms) for responsiveness, and a relatively low allocation of network bandwidth (e.g. 1 Mbps.) for text display. As another example, QoS tag '2(VO)' 540 may be applied to an uplink network packet associated with online gaming metadata, which same as QoS tag '2(VO)' 536, may designate a moderately high QoS packet priority (e.g., '2' for latency of <50 ms) for responsiveness, and a relatively low allocation of network bandwidth (e.g. 1 Mbps.). However, in this example, the relatively low allocation of network bandwidth is due to the relatively small amounts of data that may be communicated during an online gaming session. As yet another example, QoS tags '0(BE)' 544, 548 may be applied to uplink network packets associated with certain web traffic, which may designate moderately low QoS packet priority (e.g., '0' for latency of >50 ms) for responsiveness, and a relatively low allocation of network bandwidth (e.g. 1 Mbps.) for content provision to the user 202.

In various embodiments, the QoS tag may be implemented to use certain features of the Wireless Fidelity (WiFi) Multimedia (WMM) interoperability certification, supported by the WiFi Alliance (WFA), which is commonly used to prioritize WiFi network traffic. In various embodiments, the QoS tag may be implemented to use certain features of Differentiated Services Code Point (DSCP), which as commonly implemented is a network packet header value that can be used to request high priority, or best effort, for delivery of network traffic. Skilled practitioners of the art will recognize that many such examples of QoS tags, and the method by which they are generated or implemented, are possible. Accordingly, the foregoing is not intended to limit the spirit, scope, or intent of the invention.

In certain embodiments, the resulting classified network packets may then be concatenated to generate queues of uplink network packets, such as uplink network queues '$A_1$' 552, '$A_2$' 554, '$B_1$' 556, '$C_1$' 558, and '$D_3$' 560, according to their packet traffic type, such as '1(VI)' 532, '2(VO)' 536, 540, and '0(BE)' 544, 548. In certain embodiments, the intelligent connectivity system 118 may be implemented to generate the queues of uplink network packets. In certain embodiments, each resulting queue of uplink network packets may then be routed in an uplink network traffic stream 504 to a destination Internet Protocol (IP) address and port corresponding to an associated network host 506. As an example, as shown in FIG. 5, queues '$A_1$' 552 and '$A_2$' 554 are respectively routed in an uplink network traffic stream 504 to ports '1' 522 and '2' 524 of a network host having IP address 'A' 514. Likewise, queues '$B_1$' 556, '$C_1$' 558, and '$D_3$' 560 are respectively routed in uplink network traffic streams 504 to ports '1' 526, '1' 528 and '3' 530 of the network hosts having IP addresses 'B' 516, 'C' 518, and 'D' 520.

In certain embodiments, the intelligent connectivity system 118 may be implemented to manage the queues (e.g., queues '$A_1$' 552, '$A_2$' 554, '$B_1$' 556, '$C_1$' 558, and '$D_3$' 560) of uplink network packets. In certain embodiments, the intelligent connectivity system 118 may be implemented to forward such queues of uplink network packets to a particular AP 234, such as a network router. In certain embodiments, the AP 234 may be implemented to manage the queues of uplink network packets it receives from the intelligent connectivity system 118. In certain embodiments, the AP 234 may be implemented to route the queues of uplink network packets in corresponding network traffic streams 504 to one or more destination network hosts 506 as described in greater detail herein.

In certain embodiments, the prioritization of routing to the one or more network hosts 506 may be based upon a prioritization value associated with each packet traffic type. As an example, prioritization values '50', '30', '20', and '10' may correspond to packet traffic types '1', '2', '3', and '4'. In this example, the prioritization value of '50' corresponding to packet traffic type '1' may signify that it has the highest priority of all packet traffic types. Likewise, the prioritization value of '10' corresponding to packet traffic type '4' may signify that it has the lowest priority of all packet traffic types. In these embodiments, the prioritization value selected to correspond to a particular packet traffic type, and the method by which such correspondence is implemented, is a matter of design choice.

In various embodiments, the AP 234 may be implemented to have one main queue and one back-up queue. In certain embodiments, the main queue may be implemented to include one or more high priority queues of uplink network packets and the back-up queue may be implemented to include one or more low priority queues of uplink network packets. In certain embodiments, the AP 234 may be implemented to route all high priority queues of uplink network packets in the main queue before it routes any low priority queues of uplink network packets in the back-up queue.

In various embodiments, the AP 234 may be implemented to give precedence to the high priority queues of uplink network packets in the main queue at the expense of any low priority queues of uplink network packets in the back-up queue. In certain embodiments, such precedence may be based upon a ratio of high priority queues of uplink network packets to low priority queues of uplink network packets. As an example, the AP 234 may be implemented to use a ratio of 80-20, 75-25, 70-30, and so forth when giving precedence to a particular high priority queue of uplink network packets. In certain embodiments, the particular ratio selected by the AP 234 may be based upon the length of a particular high priority queue of uplink network packets relative to the length of a particular low priority queue of uplink network packets. In these embodiments, the ratio selected for giving precedence to a particular high priority queue of uplink network packets over a particular low priority queue of uplink network packets is a matter of design choice.

In certain embodiments, one or more network hosts 506 may be implemented to processes uplink network packets they may receive to generate one or more associated downlink network packets. As used herein, a downlink network packet broadly refers to a network packet containing information generated by a network host 506 as a result of processing certain information contained in one or more received uplink network packets, described in greater detail herein. In certain embodiments, a network host 506 may be implemented to process the received uplink network traffic streams 504 to determine the QoS prioritization of each packet traffic type it may contain.

In certain embodiments, a network host 506 may be implemented to use the QoS prioritization to prioritize the order in which it processes each uplink network packet. In certain embodiments, a network host 506 may be implemented to use certain default QoS prioritization weights in determining the order in which it processes each uplink network packet. As an example, the network host 506 may be implemented to respectively use default weights of '50', '25', '15', and '10' for packet traffic types '1', '2', '3', and '4', where packet traffic type '1' is the highest priority and packet traffic type '4' is the lowest priority.

In certain embodiments, the network host 506 may be implemented to concatenate the resulting downlink network packets 534, 538, 542, 546, 550 into an associated downlink stream of network packets 504 according to their packet traffic type (e.g., '1(VI)' 532, '2(VO)' 536, 540, and '0(BE)' 544, 548). In certain embodiments, the network host 506 may be implemented to prioritize the order of the downlink network packets 534, 538, 542, 546, 550 in the downlink stream of network packets 506 according to the QoS prioritization (e.g., '1', '2', '3', and '4') associated with the uplink network packets they were generated from. In certain embodiments, the network host 506 may be implemented to apply default weights, described in greater detail herein, to generate a shaped downlink stream of network packets. In certain embodiments, the default weights may be implemented to correspond to the QoS prioritization associated with the uplink network packets each downlink network packet was generated from.

In certain embodiments, the network host 506 may be implemented to return the shaped downlink stream of network packets to the AP 234, which in turn returns the shaped downlink stream of network packets to the intelligent connectivity system 118. In various embodiments, the network host 506 may be implemented to return the downlink network packets with the QoS prioritization (e.g., '1', '2', '3', and '4') associated with the uplink network packets they were generated from. In various embodiments, the network host 506 may be implemented to provide certain information associated with the QoS prioritizations to the AP 234.

In certain embodiments, the AP 234 may be implemented to mirror the QoS information to the intelligent connectivity system 118. In certain embodiments, the mirrored information associated with the QoS prioritizations may be used by the intelligent connectivity system 118 to enable a closed-loop network environment for prioritization of uplink and downlink network packets. In certain embodiments, the intelligent connectivity system 118 may be implemented to enable standalone prioritization of uplink and downlink network packets if the QoS prioritizations are not returned in the downlink stream of network packets.

In various embodiments, the intelligent connectivity system 118 may be implemented to observe the packet drop ratio for each packet traffic type in the received downlink stream of network traffic 504. In certain of these embodiments, the intelligent connectivity system 118 may be implemented to determine whether the QoS packet prioritization objectives for each application 502 executing on the user device 204 is being met for each associated packet traffic type. If not, then the intelligent traffic connectivity system 118 may be implemented to evaluate the packet drop ratio for each packet traffic type and recommend new weights for shaping future downlink network traffic streams. The intelligent connectivity system 118 then communicates the resulting recommended weights via the AP 234 to the appropriated network host 506.

In certain embodiments, as described in greater detail herein, bandwidth allocation operations may begin by each network packet generated by an application 502 being tagged with a QoS tag by the intelligent connectivity system 118 to classify its packet traffic type. As likewise described in greater detail herein, the resulting classified network packets may then be concatenated to generate queues of uplink network packets, which may then be routed in an uplink network traffic stream 504 to an AP 234. Once received, the AP 234 may use the QoS tags corresponding to each uplink network packet to prioritize the queues of network packets for processing. In certain embodiments, each resulting queue may then routed in prioritized order in a corresponding uplink network traffic stream 504 to a destination Internet Protocol (IP) address and port corresponding to an associated network host 506. In turn, the network host 506 may be implemented in certain embodiments to processes the received uplink network traffic stream to determine the QoS prioritization of each packet traffic type it may contain.

In certain embodiments, the network host 506 may be implemented to process the received uplink network packets to generate a downlink stream of network traffic 504. In certain embodiments, the network host 506 may be implemented to use the QoS packet tags, as described in greater detail herein, to prioritize the allocation of bandwidth to each downlink network packet within an associated downlink stream of network traffic 504. In various embodiments, the allocation of bandwidth to each downlink network packet may be based upon a prioritization value associated with each packet traffic type. In certain embodiments, the prioritization value may be implemented to allocate bandwidth to each downlink network packet in a downlink stream of network traffic 504 according to a corresponding weighting value.

As an example, weighting values of '5', '4', '2', and '1' may correspond to packet traffic types '1', '2', '3', and '4'. In this example, the weighting value of '5' corresponding to packet traffic type '1' may signify that it has the highest bandwidth allocation weighting of all packet traffic types. Likewise, a weighting value of '1' corresponding to packet traffic type '4' may signify that it has the lowest bandwidth allocation weighting of all packet traffic types. Accordingly, a downlink network packet having a packet traffic type of '1' may be allocated five times as much bandwidth as a downlink network packet having a packet traffic type of '4'. In these embodiments, the prioritization value selected to correspond to a particular packet traffic type, its associated bandwidth allocation weighting, and the method by which such weighting is determined and assigned, is a matter of design choice.

In certain embodiments, the weighting values used to allocate bandwidth may be adjusted when sufficient bandwidth is available. As an example, a downlink stream of network packets 504 may not include any downlink network packets having a packet traffic type of '1'. Accordingly, the bandwidth allocation weighting values may be respectively adjusted to '5', '4', and '3' for packet traffic types '2', '3', and '4'. In certain embodiments, the weighting values used to allocate bandwidth may be adaptively adjusted according to the percentage of dropped packets, or packet error rates, or both, associated with a particular downlink stream of network packets 504.

In various embodiments, the intelligent connectivity system 118 may be implemented to observe the packet drop ratio, or packet error rates, or both, for each packet traffic type in the received downlink stream of network traffic 504. In certain of these embodiments, the intelligent connectivity system 118 may be implemented to determine whether the QoS packet prioritization objectives for each application 502 executing on the user device 204 is being met for each associated packet traffic type. If not, then the intelligent traffic connectivity system 118 may be implemented to evaluate the packet drop ratio, or packet error rates, or both, for each packet traffic type and recommend new weights for shaping future downlink network traffic streams. The intelligent connectivity system 118 then communicates the resulting recommended weights via the AP 234 to the appropriated network host 506.

In certain embodiments, a determination may be made whether QoS tags are detected in the downlink streams of network traffic 504. If so, then the returned QoS tags may be used in certain embodiments, as described in greater detail herein, to perform closed loop network environment bandwidth operations to allocate bandwidth to each network packet in the downlink stream of network traffic 504. Otherwise, as likewise described in greater detail herein, stand-alone bandwidth allocation operations may be performed in certain embodiments to allocate bandwidth to each network packet in the downlink stream of network traffic 504.

Figure 6:
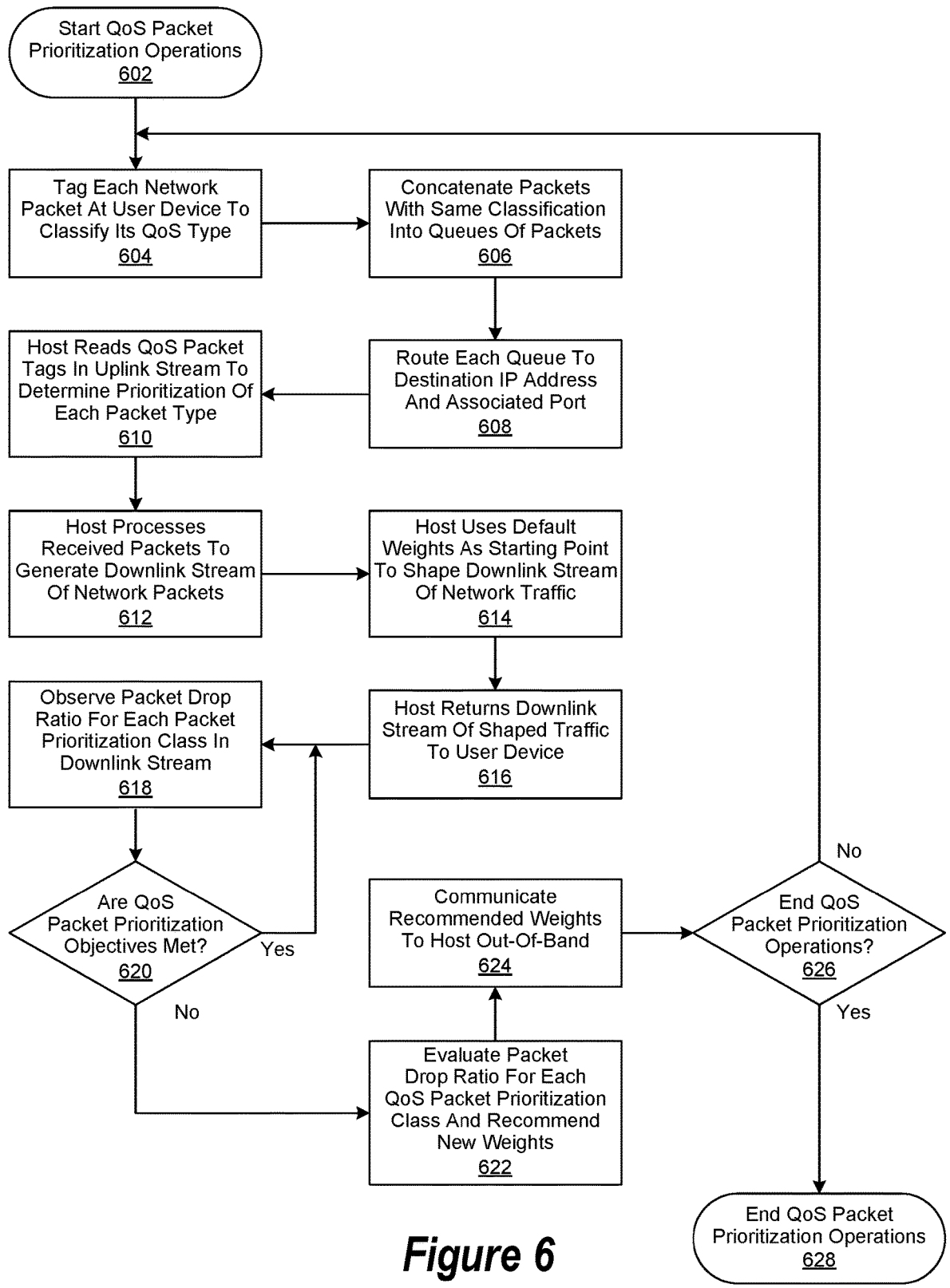
FIG. 6 shows a flowchart of the performance of network packet prioritization operations.

FIG. 6 shows a flowchart of the performance of network packet prioritization operations implemented in accordance with an embodiment of the invention. In this embodiment, network packet prioritization operations are begun in step 602, followed by each network packet being tagged in step 604 at the user device, as described in greater detail herein, to classify its packet traffic type. The resulting classified packets are then concatenated in step 606 to generate queues of network packets according to their packet traffic type.

Each resulting queue is then routed in an uplink network traffic stream, likewise described in greater detail herein, to a destination Internet Protocol (IP) address and port corresponding to an associated network host in step 608. The network host then processes the received uplink network traffic stream in step 610 to determine the QoS prioritization of each packet traffic type it may contain. In turn, the network host processes the received uplink network packets to generate a downlink stream of network traffic in step 612.

Then, in step 614, the network host uses default weights, described in greater detail herein, to shape the downlink stream of network traffic according to the QoS prioritization of each downlink network packet it may contain. Thereafter, the network host returns the shaped downlink stream of network packets to the user device in step 616. In turn, the user device observes the packet drop ratio in step 618 for each packet prioritization class in the received downlink stream of network traffic.

A determination is then made in step 620 whether the QoS packet prioritization objectives are being met for each packet traffic type. If so, then the process is continued, proceeding with step 618. Otherwise, the packet drop ratio for each packet traffic type is evaluated and new weights for shaping future downlink network traffic streams are recommended by the user device in step 618.

The resulting recommended weights are then communicated to the network host in step 624. A determination is then made in step 626 whether to continue QoS packet prioritization operations. If not, then the process is continued, proceeding with step 604. Otherwise, QoS packet prioritization operations are ended in step 628.

Figure 7:
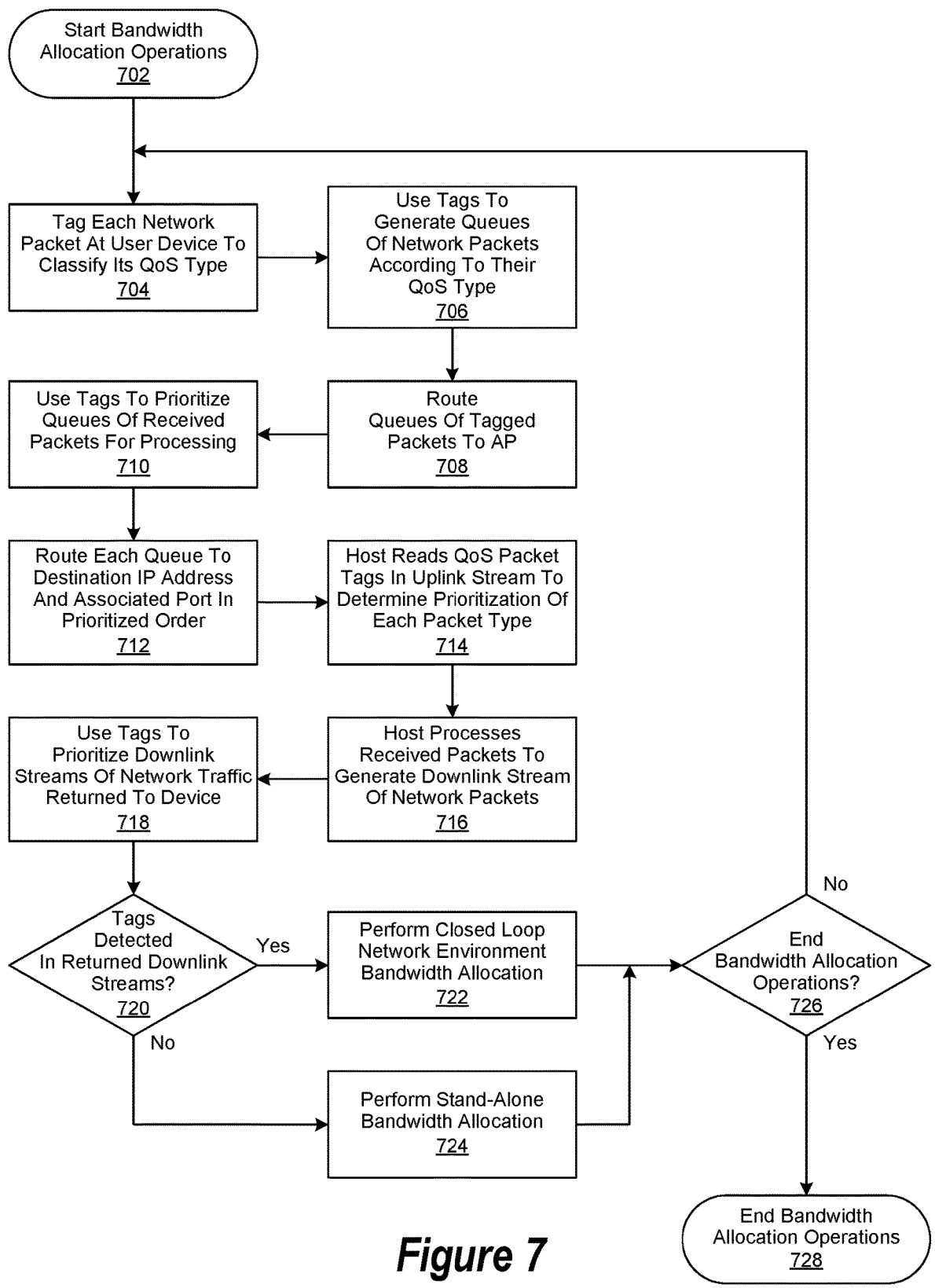
FIG. 7 shows a flowchart of the performance of bandwidth allocation operations.

FIG. 7 shows a flowchart of the performance of network bandwidth allocation operations implemented in accordance with an embodiment of the invention. In this embodiment, bandwidth allocation operations are begun in step 702, followed by each network packet being tagged in step 604 at the user device, as described in greater detail herein, to classify its packet traffic type. The resulting classified packets are then concatenated in step 706 to generate queues of network packets according to their packet traffic type.

The resulting queues of tagged network packets are then routed to an access point (AP) in step 708. Once received, the AP uses the QoS tags in step 710 to prioritize the queues of network packets for processing. Each resulting queue is then routed in prioritized order in a corresponding uplink network traffic stream to a destination Internet Protocol (IP) address and port corresponding to an associated network host in step 712.

The network host then processes the received uplink network traffic stream in step 714 to determine the QoS prioritization of each packet traffic type it may contain. In turn, the network host processes the received uplink network packets to generate a downlink stream of network traffic in step 716. Then, in step 614, the network host uses the QoS packet tags, as described in greater detail herein, to prioritize each downlink stream of network traffic returned to the user device according to the QoS prioritization of each downlink network packet it may contain.

A determination is then made in step 720 whether QoS tags are detected in the downlink streams of network traffic. If so, then the returned QoS tags are used in step 722, as described in greater detail herein, to perform closed loop network environment bandwidth operations to allocate bandwidth to each network packet in the downlink stream of network traffic. Otherwise, stand-alone bandwidth allocation operations, likewise described in greater detail herein, are performed in step 724 to allocate bandwidth to each network packet in the downlink stream of network traffic. Thereafter, or after operations performed in step 722 are completed, a determination is made in step 726 whether to end bandwidth allocation operations. If not, the process is continued, proceeding with step 704. Otherwise, bandwidth allocation operations are ended in step 728.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an intelligent connectivity operation, comprising:

generating an uplink packet by a client information handling system, the uplink packet being one of a plurality of uplink packets generated by the client information handling system, the uplink packet being associated with a particular application, the uplink packet being contained within a stream of network traffic, the client information handling system executing an intelligent connectivity system, the intelligent connectivity system communicating with an access point via a network link, the access point enabling the client information handling system to connect to a wired network, the wired network comprising a plurality of network hosts each of the plurality of network hosts communicating with the intelligent connectivity system via the network link between the access point and the client information handling system and respective queues of network packets;

classifying the uplink packet with a particular packet traffic type, the particular packet traffic type being classified from a plurality of network traffic types, the network traffic for the particular application including a plurality of different packet traffic types;

associating packet quality of service information with the uplink packet based upon the particular packet traffic type, the associating packet quality of service information including associating a quality of service tag with the uplink packet, the associating the quality of service tag with the uplink packet being performed by the intelligent connectivity system, the packet quality of service information including information associated with prioritization of the uplink packet and an amount of bandwidth to allocate to the uplink packet;

receiving a down link packet to the client information handling system, the downlink packet being one of a plurality of downlink packets received by the client information handling system;

determining whether the down link packet corresponds to the particular packet traffic type;

associating the down link packet with the packet priority information of the uplink packet when the downlink packet corresponds to the particular packet traffic type; and, prioritizing an order of the plurality of downlink packets according to the information associated with prioritization of an associated uplink packet.

2. The method of claim 1, wherein:
packet quality of service information includes at least one of packet priority information and bandwidth allocation information.

3. The method of claim 2, further comprising:
providing the packet quality of service information to an access point along with the uplink packet; and,
associating the packet quality of service information with an associated down link packet.

4. The method of claim 3, further comprising:
performing a queue management operation, the queue management operation maintaining a plurality of queues, each of the plurality of queues corresponding to a particular application quality of service level, the quality of service level corresponding to packet quality of service information for the particular application.

5. The method of claim 4, wherein:
the client information handling system and the access point each maintain a respective plurality of queues.

6. The method of claim 3, wherein:
the access point mirrors the quality of service information when sending the down link packet to the client information handling system; and,
the client information handling system detects the mirrored quality of service information and performs a closed loop quality of service operation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

generating an uplink packet by a client information handling system, the uplink packet being one of a plurality of uplink packets generated by the client information handling system, the uplink packet being associated with a particular application, the uplink packet being contained within a stream of network traffic, the client information handling system executing an intelligent connectivity system, the intelligent connectivity system communicating with an access point via a network link, the access point enabling the client information handling system to connect to a wired network, the wired network comprising a plurality of network hosts, each of the plurality of network hosts communicating with the intelligent connectivity system via the network link between the access point and the client information handling system and respective queues of network packets;

classifying the uplink packet with a particular packet traffic type, the particular packet traffic type being classified from a plurality of network traffic types, the network traffic for the particular application including a plurality of different packet traffic types;

associating packet quality of service information with the uplink packet based upon the particular packet traffic type, the associating packet quality of service information including associating a quality of service tag with the uplink packet, the associating the quality of service tag with the uplink packet being performed by the intelligent connectivity system, the packet quality of service information including information associated with prioritization of the uplink packet and an amount of bandwidth to allocate to the uplink packet;

receiving a down link packet to the client information handling system, the downlink packet being one of a plurality of downlink packets received by the client information handling system;

determining whether the down link packet corresponds to the particular packet traffic type;

associating the down link packet with the packet priority information of the uplink packet when the downlink packet corresponds to the particular packet traffic type; and, prioritizing an order of the plurality of downlink packets according to the information associated with prioritization of an associated uplink packet.

8. The system of claim 7, wherein:
packet quality of service information includes at least one of packet priority information and bandwidth allocation information.

9. The system of claim 8, wherein the instructions executable by the processor are further configured for:
providing the packet quality of service information to an access point along with the uplink packet; and,
associating the packet quality of service information with an associated down link packet.

10. The system of claim 9, wherein the instructions executable by the processor are further configured for:
performing a queue management operation, the queue management operation maintaining a plurality of queues, each of the plurality of queues corresponding to a particular application quality of service level, the quality of service level corresponding to packet quality of service information for the particular application.

11. The system of claim 10, wherein:
the client information handling system and the access point each maintain a respective plurality of queues.

12. The system of claim 9, wherein:
the access point mirrors the quality of service information when sending the down link packet to the client information handling system; and,
the client information handling system detects the mirrored quality of service information and performs a closed loop quality of service operation.

13. A non-transitory, computer-readable storage medium embodying computer program code, the computer program code comprising computer executable instructions configured for:
generating an uplink packet by a client information handling system, the uplink packet being one of a plurality of uplink packets generated by the client information handling system, the uplink packet being associated with a particular application, the uplink packet being contained within a stream of network traffic, the client information handling system executing an intelligent connectivity system, the intelligent connectivity system communicating with an access point via a network link, the access point enabling the client information handling system to connect to a wired network, the wired network comprising a plurality of network hosts, each of the plurality of network hosts communicating with the intelligent connectivity system via the network link between the access point and the client information handling system and respective queues of network packets;
classifying the uplink packet with a particular packet traffic type, the particular packet traffic type being classified from a plurality of network traffic types, the network traffic for the particular application including a plurality of different packet traffic types;
associating packet quality of service information with the uplink packet based upon the particular packet traffic type, the associating packet quality of service information including associating a quality of service tag with the uplink packet, the associating the quality of service tag with the uplink packet being performed by the intelligent connectivity system, the packet quality of service information including information associated with prioritization of the uplink packet and an amount of bandwidth to allocate to the uplink packet;
receiving a down link packet to the client information handling system, the downlink packet being one of a plurality of downlink packets received by the client information handling system;
determining whether the down link packet corresponds to the particular packet traffic type;
associating the down link packet with the packet priority information of the uplink packet when the downlink packet corresponds to the particular packet traffic type; and,
prioritizing an order of the plurality of downlink packets according to the information associated with prioritization of an associated uplink packet.

14. The non-transitory, computer-readable storage medium of claim 13, wherein:
packet quality of service information includes at least one of packet priority information and bandwidth allocation information.

15. The non-transitory, computer-readable storage medium of claim 14, wherein computer executable instructions are further configured for:
providing the packet quality of service information to an access point along with the uplink packet; and,
associating the packet quality of service information with an associated down link packet.

16. The non-transitory, computer-readable storage medium of claim 15, wherein computer executable instructions are further configured for:
performing a queue management operation, the queue management operation maintaining a plurality of queues, each of the plurality of queues corresponding to a particular application quality of service level, the quality of service level corresponding to packet quality of service information for the particular application.

17. The non-transitory, computer-readable storage medium of claim 16, wherein:
the client information handling system and the access point each maintain a respective plurality of queues.

18. The non-transitory, computer-readable storage medium of claim 15, wherein:
the access point mirrors the quality of service information when sending the down link packet to the client information handling system; and,
the client information handling system detects the mirrored quality of service information and performs a closed loop quality of service operation.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *